A. MACAULEY.
MOTOR VEHICLE.
APPLICATION FILED JULY 31, 1911.
1,122,014.
Patented Dec. 22, 1914.
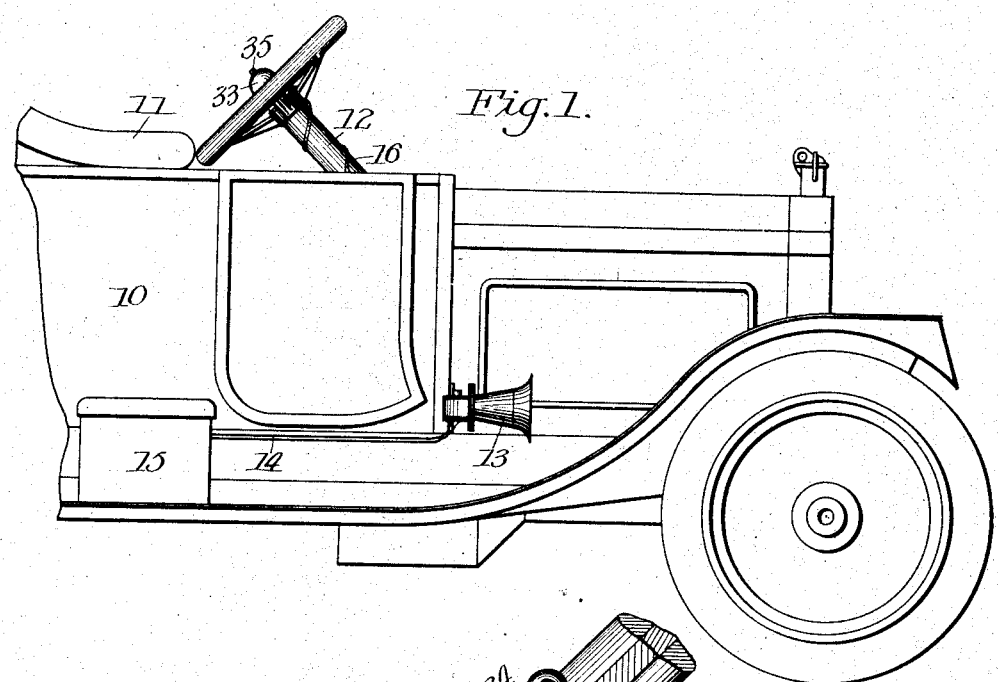
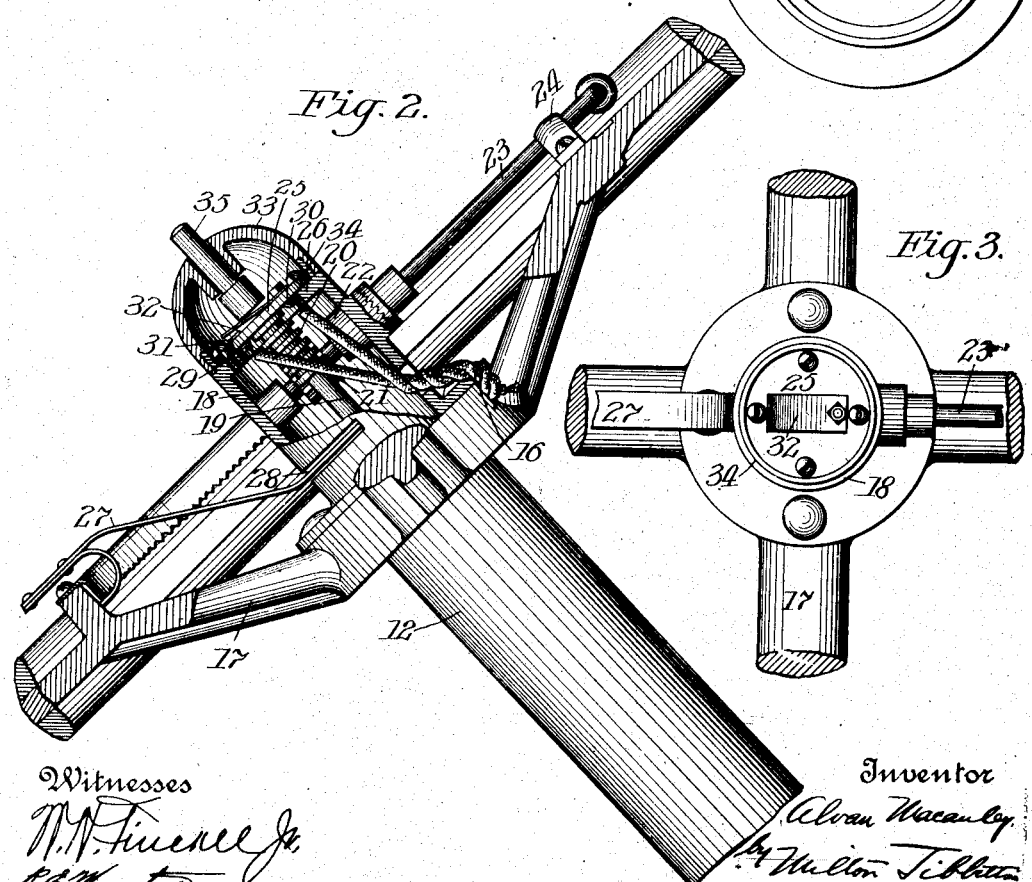
Witnesses
Inventor
Alvan Macauley
Attorney

UNITED STATES PATENT OFFICE.

ALVAN MACAULEY, OF DETROIT, MICHIGAN, ASSIGNOR TO PACKARD MOTOR CAR COMPANY, OF DETROIT, MICHIGAN, A CORPORATION OF MICHIGAN.

MOTOR-VEHICLE.

1,122,014.   Specification of Letters Patent.   Patented Dec. 22, 1914.

Application filed July 31, 1911. Serial No. 641,410.

*To all whom it may concern:*

Be it known that I, ALVAN MACAULEY, a citizen of the United States, and resident of Detroit, Wayne county, State of Michigan, have invented certain new and useful Improvements in Motor-Vehicles, of which the following is a specification.

This invention relates to motor vehicles and particularly to the combination of the steering post of such a vehicle with a signaling device including a contact maker or switch.

One of the objects of the invention is to mount the contact device or switch of a signal horn on the steering post of an automobile so that the contact device may be conveniently reached for operation by the driver without regard to the particular position of the steering wheel.

One embodiment of the invention is illustrated in and its various other objects and advantages will be apparent from the following description, taken with the drawings, in which—

Figure 1 is a side elevation of the forward portion of a motor vehicle showing the invention embodied in the steering column thereof; Fig. 2 is a part sectional view through the support on the upper end of the steering post; and Fig. 3 is a plan view of the upper end of the steering post and steering wheel with the housing for the contact device removed.

An electrically driven horn or other signal forms part of the equipment of many of the automobiles on the market today. These horns are, as a rule, suitably connected by wiring with the ignition battery or with dry cells and they are operated by a push button contact device arranged on some part of the vehicle within reach of the driver. The present invention involves such a signaling device and is particularly designed to arrange the push button contact device in the most convenient position for the driver.

Referring to the drawings, the body of the vehicle is represented at 10 and the driver's seat at 11 immediately in the rear of the inclined steering post 12. The signal horn is shown at 13 and is connected by suitable wires 14 with the batteries carried in the box 15. Other wires 16 lead from the battery and horn respectively to the contact box mounted on the steering post 12. The post 12 has the steering wheel 17 suitably secured to its upper end and a tubular support 18 is also mounted on the post 12 substantially concentric therewith. A motor control rod 19 is shown extending up through the steering post and into the tubular support 18 and its upper end is formed with a circular rack 20 with which a small pinion 21 engages. This pinion is mounted in journals 22 in the support 18 and is rotated by the motor control lever 23 having a bearing 24 on one of the spokes of the steering wheel. It will be seen that the oscillation of the control lever 23 will cause a reciprocating movement of the motor control rod 19 which latter may be suitably connected with the motor for control purposes.

It is desirable that the motor control rod 19 should be limited in its upward movement and in this invention a stop is provided in the form of a disk 25 secured to a flange 26 of the support 18, which disk thus closes the upper end of the support. Another motor control lever 27 is shown in the drawing as entering a slot 28 in the support 18, and this lever may be connected in any suitable manner with another motor control rod (not shown) in the steering post. It may be remarked that in the particular motor vehicle in which the invention is shown as being embodied the lever 27 controls the motor throttle and the lever 23 controls the timing of the spark. The disk 25 is preferably made of insulating material upon which are terminals 29 and 30 to which the wires 16 are respectively connected. A stationary contact 31 and a spring contact 32 are respectively connected with the terminals 29 and 30, the spring 32 being so arranged that it is normally out of contact with the stationary contact 31 but may be caused to contact therewith by slight pressure. The upper end of the tubular support 18 is closed by a housing 33 in the form of a dome which may be screwed to the support as by threads 34. This dome supports a button 35 which projects outwardly through the center thereof and is so related to the spring 32 that pressure on the button moves the spring into contact with the stationary contact 31 thus closing the circuit for sounding the signal horn.

With the above construction the contact device is mounted within convenient reach of the operator and its position is not altered by the movement of the steering wheel as is the case when the contact device is mounted on one of the spokes of the steering wheel as has been done heretofore.

The construction is simple; the wiring is accessible and the parts easily assembled; the electrical connections are protected; the motor control rod is provided with a stop; and the upper end of the steering post is suitably housed in for the protection of the parts within it.

Having described my invention, what I claim and desire to secure by Letters Patent is:

1. The combination with an automobile steering post, of a support on the end thereof, a contact device removably mounted on said support, a removable housing over said contact device, and an operating button for said contact device extending through said housing.

2. The combination with an automobile steering post and the steering wheel thereon, of a tubular support mounted on the end of the post, a motor control device connected to said support and comprising gears inside said support, and a contact device mounted on said support beyond said control device and removable to expose said gears.

3. The combination with an automobile steering post and the steering wheel mounted thereon, of a tubular support on the end of the steering post, a motor control rod extending through the steering post and into said tubular support, a control lever journaled in said support and in a bracket on said steering wheel and adapted to operate said motor control rod, an insulating disk closing the outer end of said tubular support and forming a stop for said control rod, a control switch on said disk, and a housing over said disk and switch.

4. The combination with an automobile steering post and the steering wheel, of a housing at the upper end of the post in the center of the steering wheel, a motor control device extending into said housing and comprising connections inside said housing, and an electric contact device mounted on said housing beyond said control device and removable to expose said connections.

In testimony whereof I affix my signature in the presence of two witnesses.

ALVAN MACAULEY.

Witnesses:
W. H. FINCKEL, Jr.,
R. E. MARSTON.

Copies of this patent may be obtained for five cents each, by addressing the "Commissioner of Patents, Washington, D. C."